United States Patent
Lin et al.

(10) Patent No.: US 6,292,165 B1
(45) Date of Patent: Sep. 18, 2001

(54) ADAPTIVE PIECE-WISE APPROXIMATION METHOD FOR GAMMA CORRECTION

(75) Inventors: Tsu-Ping Lin, Nei-Pu Hsiang; Han-Min Cheng, Taichung; Chen-Pan Kung, Tainan, all of (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 09/373,565

(22) Filed: Aug. 13, 1999

(51) Int. Cl.[7] ............................................... G09G 5/10
(52) U.S. Cl. ................................. 345/147; 348/674
(58) Field of Search .......................... 345/147–149, 345/89, 63, 12, 20; 348/671, 673, 674, 687; 358/519, 521

(56) References Cited

U.S. PATENT DOCUMENTS 5,764,216 * 6/1998 Tanaka et al. ........................ 345/147
5,774,112 * 6/1998 Kasson ................................. 345/147
5,796,384 * 8/1998 Kim ..................................... 345/147

\* cited by examiner

Primary Examiner—Regina Liang

(57) ABSTRACT

An adaptive piece-wise approximation method for gamma correction is disclosed. The method includes an adaptive way for segmenting the brightness intensity input range and after the segmentation, a set of selected sampling points is taken. A simplified gamma correction circuit is then designed to omit the subtraction and the division calculation in the gamma correcting function by choosing the segmentation points appropriately. The improved gamma correction circuit comprises a multiplexer, a subtractor, an offset block, a multiplier, a division block, and an adder. An intensity signal at the set of selected input points is sampled and the sampled values are stored in providing a top value and a bottom value for the video intensity value to be gamma corrected. The video intensity value is then sent into the gamma correction circuit to get a gamma corrected data word representing pixel intensity for its respective input video intensity value.

31 Claims, 3 Drawing Sheets

ADAPTIVE PIECE-WISE APPROXIMATION METHOD FOR GAMMA CORRECTION

BACKGROUND OF THE INVENTION

1. Field of the Invention

The present invention relates to gamma correction of video intensity values and, more particularly, to an improved piece-wise approximation method for gamma correction in providing linear responses on display devices by increasing more segmentation points at the nonlinear portion of gamma correction curves.

2. Description of the Prior Art

Computer graphics systems convert image representations stored in the computer's memory to image representations which are easily understood by humans. Cathode ray tubes (CRTs) are typical displaying devices for the converted image representations, where these images are divided into arrays of pixel elements which can be stimulated to emit a range of brightness. The particular brightness of light that a pixel emits is called its "value".

All CRTs have a nonlinear transfer characteristic, i.e., the reproduced brightness on the CRT screen is a nonlinear function of the control-grid video drive. This means that doubling the voltage applied by CRT monitors will not double the brightness of the associate pixel. When display graphics are produced on graphics workstations, it is necessary to compensate for this nonlinearity. The compensation of brightness intensity values to produce a linear gradation of brightness intensities in response to a linear range of brightness intensity values is called "gamma correction". Thus, a conversion circuit has been included in most modern graphics workstations to provide linear response on the graphics monitors, where this conversion circuit is called a gamma correction circuit.

A simple method of performing gamma correction on a digitized intensity signal is to translate each of the n-bit red, green, and blue (RGB) brightness intensity values to compensated n-bit brightness intensity values using a brightness lookup table. This lookup table is typically stored in a solid state memory, usually in a read-only memory (ROM), and includes a range of brightness intensity values, each of which is associated with a corresponding gamma corrected value. However, present ROM gamma correction tables are slow and require many computer work cycles to complete gamma correction.

In many other prior art graphic workstations, gamma correction is accomplished with a random access memory (RAM) brightness lookup table for pixel brightness. The disadvantage of this method and apparatus is that RAM brightness lookup table does not allow for data compression. Also, since the brightness lookup table is used for the gamma function, not only is it required, but it cannot be used for other things.

Another prior art method uses a fixed spacing piece-wise linear approximation method of the gamma correction function to gamma correct input brightness intensity values, where selected brightness intensity values are gamma corrected into compensated brightness intensity values that are typically stored in a solid state memory. This method only requires the storing of the selected brightness intensity values and not every single value, hence, a great reduction of the requiring memory is achieved as comparing to the method of lookup table. However, the piece-wise linear approximation is inaccurate, and that is because fixed spacing makes the space in between two selected values to be fixed. Therefore, unable to look after both the accuracy at the linear and nonlinear portion of the gamma correction curve and the acceptable size of the gamma correction circuit at the same time.

A further prior art, fixed spacing piece-wise linear approximation method and lookup table method are combined to form a composite method. That is, applying lookup table method against the nonlinear portion of the gamma correction curve for increasing the gamma corrected accuracy, and applying piece-wise linear approximation method against the linear portion of the gamma correction curve for reducing the size of the gamma correction circuit. Nevertheless, the memory requires for this method is still quite large.

One more prior art method, which uses ten-bit brightness intensity values and are gamma corrected into eight-bit brightness intensity values that are written to a frame buffer. In this method, gamma correction is performed by also using the piece-wise linear approximation of the gamma correction function. The values are read from the frame buffer and are further adjusted in a brightness lookup table which provides eight-bit brightness intensity values to a digital-to-analog converter. The first correction by way of the piece-wise linear approximation provides increased accuracy; however, the piece-wise linear approximation is inaccurate enough that additional correction is required by a brightness lookup table connected to the output of the frame buffer.

The present invention does not require a brightness lookup table and thus allows the brightness lookup table to be eliminated or to be used for other purposes. Hence, there is no need for a large memory to store the lookup table. The other prior art methods utilizing approximation of the gamma correction function provides improved gamma correction over other techniques but still suffers from disadvantages. For example, there is an increase in the amount of hardware required to implement this method. There is therefore a long-felt need in searching for an improved approximation method of the gamma correction function that saves memory, enhances gamma corrected accuracy, and also reduces circuit size.

SUMMARY OF THE INVENTION

In accordance with the present invention, a method and a circuit are provided for gamma correcting video intensity values that substantially solve the aforementioned long-felt needs in the art for fast, accurate, and less memory requirement gamma correction of pixel value data. In one embodiment, an improved piece-wise method for providing gamma correction of an input to display means. The method comprising the steps of: providing a gamma correction curve having an end that is almost linear and an opposite end that is almost curving; taking a zero level input and a maximum level input as two end points of an input range; center parting the input range to form two equivalent segments; center parting those two equivalent segments to form four equivalent segments; further segmenting the gamma correction curve by using an adaptive segmentation method; and repeat the previous stage until a desired width for the smallest segment is achieved.

Now the improved piece-wise method is completely adapted to a method for gamma correcting an input video intensity value in between two sampled points to display means in accordance with a gamma correcting function. First of all, the method comprises providing a gamma correction circuit in accordance with the gamma correcting function. The gamma correction circuit includes a selector means, a subtracting means, a truncating means, a multiplier means, a shifter means, and an adder means.

The improved piece-wise method is then used to select a set of input points to be sampled. An intensity signal at the set of selected input points is sampled and the sampled values are stored for providing a top value and a bottom value for the video intensity value to be gamma corrected. The video intensity value is then sent to the gamma correction circuit, in particular to the selector means, the truncating means, and the shifter means, the top value and the bottom value for the input video intensity value are chosen. Next, the subtracting means subtracts the bottom value from the top value. The output of the subtracting means is then multiplied with the output of the truncating means, where the outcome is sent to the shifter means. Finally, the bottom value and the output of the shifter means are added together to produce a gamma corrected data word representing pixel intensity for its respective input video intensity value.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
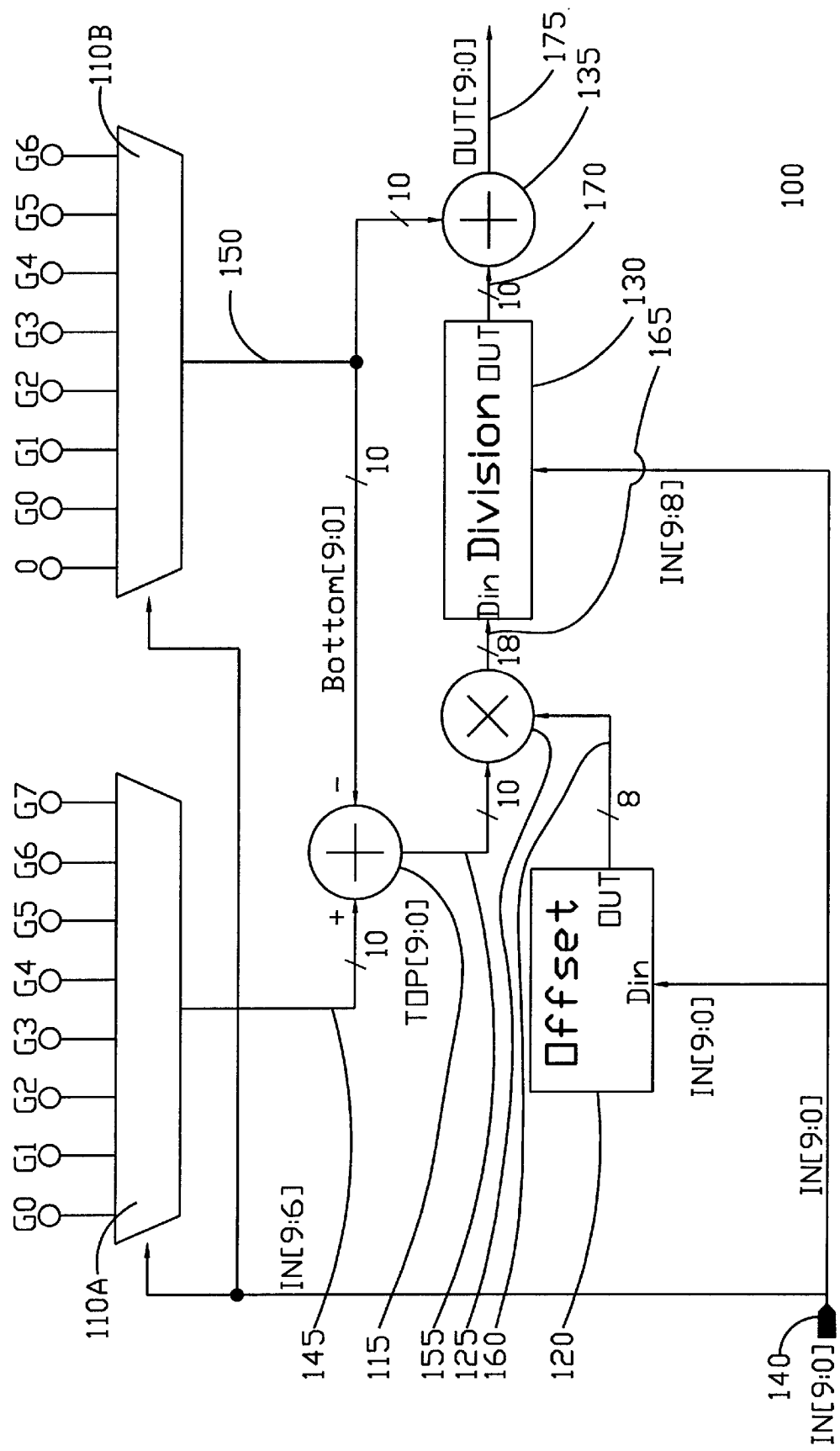
FIG. 1 is an improved gamma correction circuit provided in accordance with the present invention.

Gamma correction circuitry provided in accordance with the present invention corrects for the gamma errors of computer monitors so that a linear intensity scale sent through the gamma corrections and then to the monitor will appear linear to the human eye viewing the graphics primitives.

In one preferred embodiment of the present invention a method for approximately gamma correcting an input video intensity value (IN) in between two sampled points, A and B, to display means in accordance with a gamma correcting function, G(IN), where $$G(IN) = \frac{(IN - A) * (G(B) - G(A))}{(B - A)} + G(A)$$

G(A) and G(B) are programmed values for their respective sampled points, A and B, said method comprising the steps of: Firstly, a gamma correction circuit 100 according to the gamma correcting function G(IN) is provided in FIG. 1, where the circuit is specially designed to omit the subtraction of IN–A and the division by B–A in the gamma correcting function by choosing the segmentation points appropriately. Hence, the gamma correction circuit 100 only comprises the functioning blocks as follow: a multiplexer 110, a subtractor 115, an offset block 120, a multiplier 125, a division block 130, and an adder 135.

Figure 2:
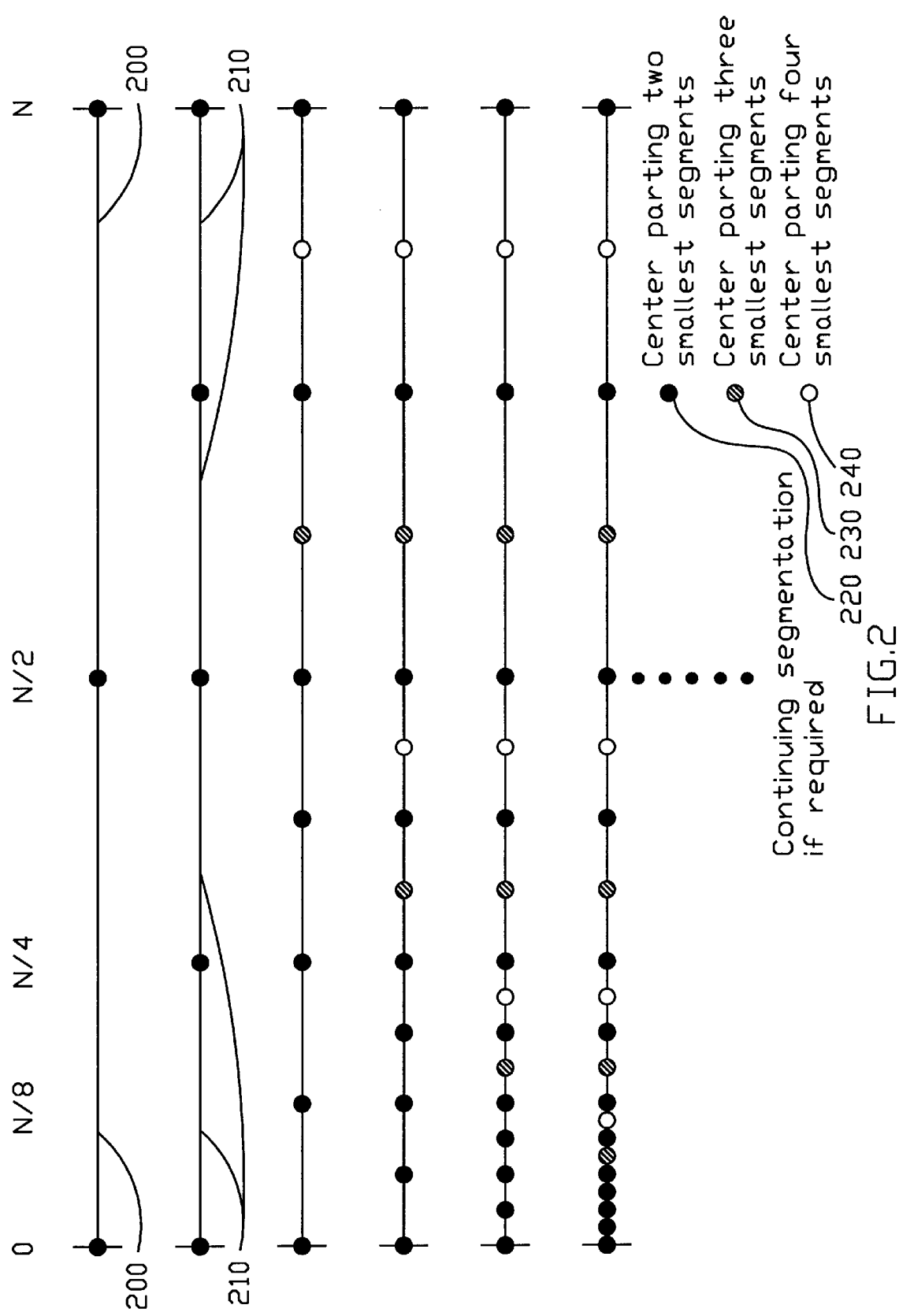
FIG. 2 is an adaptive piece-wise method for segmenting the input range provided in accordance with the present invention.

Secondly, an improved piece-wise method in selecting a set of input points to be sampled is applied. This method is shown in FIG. 2 and comprising the steps of: taking a zero level input (0) and a maximum level input (N) as two end points of an input range; center parting the input range to form two equivalent segments 200; center parting those two equivalent segments to form four equivalent segments 210; further segmenting the input range by using an adaptive segmentation method; and repeat the previous stage until a desired width for the smallest segment is achieved. The adaptive segmentation method comprises a step of center parting two smallest segments 220 of the input range, and/or a step of center parting three smallest segments 230 of the input range, and/or a step of center parting four smallest segments 240 of the input range. Furthermore, the adaptive method comprises a step of center parting more than four smallest segments of the input range as if required by users.

Figure 3:
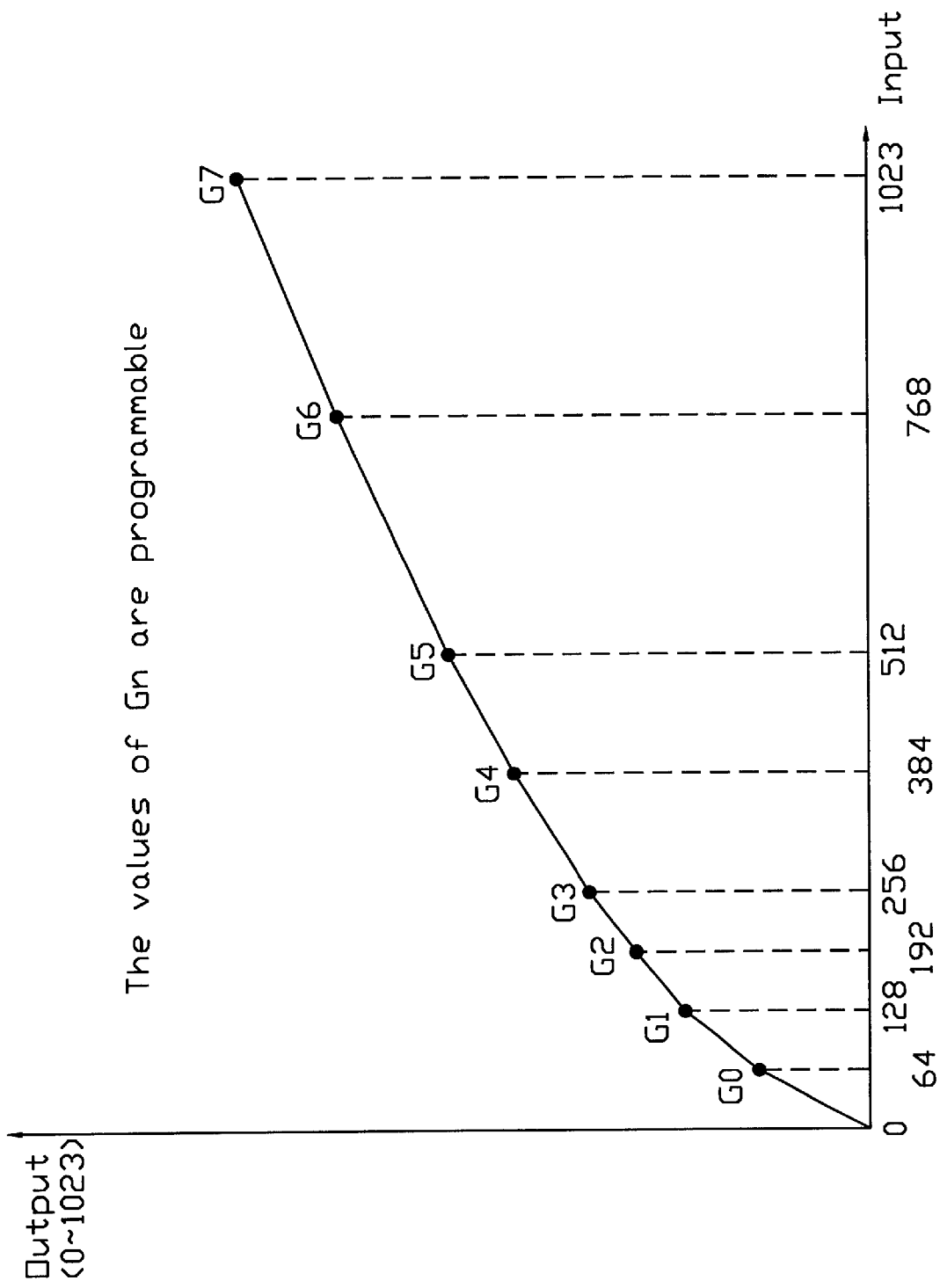
FIG. 3 shows a gamma correction curve have been segmented by the adaptive piece-wise method in accordance with the present invention.

The adaptive segmentation method is completely imitated onto any shape of gamma correction curves, as long as it is changing from almost curving to almost linear or from almost linear to almost curving along an input range. For example, as what is shown in FIG. 3, a gamma correction curve having 1024 different brightness intensity values in the input range has been segmented for choosing a set of appropriate sampling points. The input range is firstly divided into two equal segments at point G5, and those two segments are then divided into four equal segments at point G3 and G6. Now applying the adaptive method and not making it too complicated, the step of center parting two smallest segments of the input range is used only for two times to generate the point G1, G4, G0, and G2. These selected points with their relative intensity values and binary numbers are shown in Table 1.

TABLE 1

Selected Sampling Points

| Point | Value | Binary |
|---|---|---|
| 0 | 0 | 0000000000 |
| G0 | 64 | 0001000000 |
| G1 | 128 | 0010000000 |
| G2 | 192 | 0011000000 |
| G3 | 256 | 0100000000 |
| G4 | 384 | 0110000000 |
| G5 | 512 | 1000000000 |
| G6 | 768 | 1100000000 |
| G7 | 1023 | 1111111111 |

An intensity signal is sampled at the set of selected input points, 0–G7, and stored the sampled values in a solid state memory for providing the programmed values G(A) and G(B) in the multiplexer, referring back to the gamma correction circuit in FIG. 1.

Referring back to FIG. 1 again, indicated generally at 100 in the drawing is a schematic diagram of a circuit constructed in accordance with the present invention. A ten-line input bus 140 provides ten-bit IN[9:0] brightness intensity values from a conventional rasterizing engine (not shown). There are thus of a total of 1024 different brightness intensity values which may appear on bus 140.

Bus 140 is connected to the input of the offset block 120. The top four IN[9:6] and the top two IN[9:8] bits in the input bus are taken and connected to the control pins of the multiplexer 110 and the division block 130 respectively. The inputs of the multiplexer 110 are supplied by the solid state memory. For this particular example, G0–G7 are connected to the multiplexer 110A, each of the input signals is carried on a ten-bit bus. In accordance with the control pins, IN[9:6], a top value G(B) for the input video intensity value IN is selected and output to a ten-bit bus 145. Similarly, 0–G6 are connected to the multiplexer 110B. A bottom value G(A) for the input video intensity value IN is selected and output to a ten-bit bus 150.

Subtractor 115 comprises an adder and an inverting input port responsive to the top value and the bottom value for subtracting the bottom value from the top value and outputs to a ten-bit bus 155. At the same time while carrying out the above procedures, the offset block 120 performs the IN−A calculation by removing a few upper bits of the input signal IN[9:0] to give a shorten output length on a t-bit bus 160, where t is the maximum possible length, which is eight in this example. The number of bits remained and been output is according to Table 2.

TABLE 2

Function of the offset block (i.e. (IN−A)).

| IN[9:8] | 00 | 01 | 1x |
|---|---|---|---|
| OUT | Din[5:0] | Din[6:0] | Din[7:0] |

The multiplier 125 multiplies the output 155 of the subtractor 115 and the output 160 of the offset block 120, the outcome is sent to the division block 130 on a eighteen-bit bus 165 (ten plus t bits). The division block performs the division function of (G(B)−G(A))/(B−A) in the gamma correcting function by right shifting the output 165 of the multiplier 125 and outputs to a ten-bit bus 170. The number of bits to be right shifted in the division block is judged by Table 3.

TABLE 3

Function of the division block (i.e. divided by (B−A))

| IN[9:8] | 00 | 01 | 1X |
|---|---|---|---|
| OUT | Din>>6 | Din>>7 | Din>>8 |

Finally, the adder 135 adds up the bottom value 150 and the output 170 of the division block 130 to produce the gamma corrected data word G(IN) representing pixel intensity for its respective input video intensity value IN on a ten-bit bus OUT[9:0] 175.

Although specific embodiments have been illustrated and described, it will be obvious to those skilled in the art that various modifications may be made without departing from what is intended to be limited solely by the appended claims.

What is claimed is:

1. An improved piece-wise method for providing gamma correction of an input to display means, said method comprising the steps of:
   providing a gamma correction curve having an end that is almost linear and an opposite end that is almost curving;
   taking a zero level input and a maximum level input as two end points of an input range;
   center parting said input range to form two equivalent segments;
   center parting said two equivalent segments to form four equivalent segments;
   further segmenting said gamma correction curve by using an adaptive segmentation method; and
   repeat the previous stage until a desired width for the smallest segment is achieved.

2. The method in accordance with claim 1, wherein said adaptive segmentation method comprises a step of center parting two smallest segments of said input range.

3. The method in accordance with claim 1, wherein said adaptive segmentation method comprises a step of center parting more than two smallest segments of said input range.

4. The method in accordance with claim 2, wherein said adaptive segmentation method further comprises a combination of said step of center parting two smallest segments of said input range and said step of center parting more than two smallest segments of said input range.

5. The method in accordance with claim 1, wherein said center parting means dividing a segment into two smaller segments with equal length.

6. The method in accordance with claim 1, wherein said gamma correction curve can be in any style, as long as it is changing from almost curving to almost linear along said input range.

7. The method in accordance with claim 1, wherein said gamma correction curve can be in any style, as long as it is changing from almost linear to almost curving along said input range.

8. The method in accordance with claim 6, wherein said changing comprises changes in gradient from large to small.

9. The method in accordance with claim 7, wherein said changing comprises changes in gradient from small to large.

10. The method in accordance with claim 8, wherein said desired width can be as small as two but not less than, and it is heavily depending on the gradient value, the larger the value the smaller the width is required.

11. A circuit for providing gamma correction of an input IN in between two sampled points, A and B, to display means in accordance with a gamma correcting function G(IN), where G(IN)=(IN−A)*(G(B)−G(A))/(B−A)+G(A), G(A) and G(B) are programmed values for their respective sampled points, A and B, said circuit comprising:
   selector means responsive to upper bits of said input for choosing a top value G(B) and a bottom value G(A) for said input IN;
   subtracting means responsive to said top value and said bottom value for subtracting said bottom value from said top value;
   truncating means responsive to said input for removing a few upper bits of said input;
   multiplier means responsive to an output of said subtracting means and an output of said truncating means for generating their product;
   shifter means responsive to upper bits of said input and an output of said multiplier means for carrying out a division function; and
   adder means responsive to said bottom value and an output of said shifter means for generating a gamma corrected data word representing pixel intensity.

12. The circuit in accordance with claim 11, wherein said selector means comprises a multiplexer having stored sampling values as its inputs.

13. The circuit in accordance with claim 11, wherein said subtracting means comprises an adder means and an inverting input port.

14. The circuit in accordance with claim 11, wherein said truncating means performs the subtracting function of IN−A in said gamma correcting function.

15. The circuit in accordance with claim 11, wherein said shifter means performs the division function of (G(B)−G(A))/(B−A) in said gamma correcting function by right shifting said output of said multiplier means.

16. A method for gamma correcting an input video intensity value IN in between two sampled points, A and B, to display means in accordance with a gamma correcting function G(IN), where G(IN)=(IN−A)*(G(B)−G(A))/(B−A)+G(A), G(A) and G(B) are programmed values for their respective sampled points, A and B, said method comprising the steps of:

providing a gamma correction circuit in accordance with said gamma correcting function;

applying an improved piece-wise method to select a set of input points to be sampled;

sampling an intensity signal at said selected set of input points;

storing sampled values to provide said programmed values G(A) and G(B) for said gamma correction circuit;

sending said input video intensity value IN into said gamma correction circuit;

selecting a top value G(B) and a bottom value G(A) for said input video intensity value IN;

subtracting said bottom value from said top value and outputs a difference value; removing a few upper bits of said input video intensity value and outputs to a truncated value;

multiplying said difference value and said truncated value, the outcome is sent to a product value;

right shifting said product value to a length that is equivalent to the length of said input intensity video value, and outputs the result to a shifted value; and adding said bottom value and said shifted value to produce a gamma corrected data word G(IN) representing pixel intensity for its respective input video intensity value IN.

17. The method in accordance with claim 16, wherein said gamma correction circuit comprises a selector means, a subtracting means, a truncating means, a multiplier means, a shifter means, and an adder means.

18. The method in accordance with claim 17, wherein said selector means responsive to upper bits of said input video intensity value for choosing said top value G(B) and said bottom value G(A) for said input video intensity value IN, furthermore, said selector means comprises a multiplexer having stored sampling values as its inputs.

19. The method in accordance with claim 17, wherein said subtracting means comprises an adder means and an inverting input port.

20. The method in accordance with claim 17, wherein said truncating means responsive to said input video intensity value for performing the subtracting function of IN−A in said gamma correcting function.

21. The method in accordance with claim 17, wherein said shifter means responsive to upper bits of said input video intensity value and said product value for carrying out the division function of (G(B)−G(A))/(B−A) in said gamma correcting function.

22. The method in accordance with claim 16, wherein said improved piece-wise method comprising the steps of:

providing a gamma correction curve having an end that is almost linear and an opposite end that is almost curving;

taking a zero level input and a maximum level input as two end points of an input range;

center parting said input range to form two equivalent segments;

center parting said two equivalent segments to form four equivalent segments;

further segmenting said gamma correction curve by using an adaptive segmentation method; and repeating the previous stage until a desired width for the smallest segment is achieved.

23. The method in accordance with claim 22, wherein said adaptive segmentation method comprises a step of center parting two smallest segments of said input range.

24. The method in accordance with claim 22, wherein said adaptive segmentation method comprises a step of center parting more than two smallest segments of said input range.

25. The method in accordance with claim 23, wherein said adaptive segmentation method further comprises a combination of said step of center parting two smallest segments of said input range and said step of center parting more than two smallest segments of said input range.

26. The method in accordance with claim 22, wherein said center parting means dividing a segment into two smaller segments with equal length.

27. The method in accordance with claim 22, wherein said gamma correction curve can be in any style, as long as it is changing from almost curving to almost linear along said input range.

28. The method in accordance with claim 22, wherein said gamma correction curve can be in any style, as long as it is changing from almost linear to almost curving along said input range.

29. The method in accordance with claim 27, wherein said changing comprises changes in gradient from large to small.

30. The method in accordance with claim 28, wherein said changing comprises changes in gradient from small to large.

31. The method in accordance with claim 29, wherein said desired width can be as small as two but not less than, and it is heavily depending on the gradient value, the larger the value the smaller the width is required.

\* \* \* \* \*